United States Patent Office 2,817,663
Patented Dec. 24, 1957

2,817,663

PREPARATION OF 2-METHYL OXAZOLIDINES AND TETRAHYDRO-1,3-OXAZINES

Lawrence E. Conlon, Levittown, and Warren H. Watanabe, Philadelphia, Pa., assignors to Rohm & Haas Company, Philadelphia, Pa., a corporation of Delaware No Drawing. Application October 5, 1955
Serial No. 538,784

7 Claims. (Cl. 260—244)

This invention deals with a method for preparing 2-methyl oxazolidines and 2-methyl tetrahydro-1,3-oxazines. It comprises reacting in the absence of added catalyst acetylene under pressure and an aminoalcohol having two to three carbon atoms between alcoholic hydroxyl group and the amino nitrogen and having a non-tertiary amino group.

Acetylene has been reacted with alcohols in the presence of alkali metal catalysts or zinc or cadmium catalysts to form vinyl ethers. In the presence of zinc or cadmium acetate N-phenyl ethanolamine has been observed to give also 2-methyl-3-phenyloxazolidine. When, however, acetylene and N-phenyl ethanolamine are brought together in the absence of catalyst under conditions of pressure and temperature which might be expected to cause them to react, no oxazolidine can be isolated.

It is, therefore, surprising to discover that when non-aromatic aminoalcohols of the structure shown below are reacted with acetylene in the absence of added catalyst, there are obtained not vinyl ethers but oxazolidines or tetrahydro-1,3-oxazines, depending upon whether there are two or three carbon atoms between the hydroxyl and amine groups of the aminoalcohol. According to our discovery there are reacted aminoalcohols of the formula

R⁰NH—A—OH and acetylene by heating a mixture thereof between 100° and 200° C. in the absence of added catalyst under a pressure from 20 to 40 atmospheres.

In the above formula A represents an alkylene group of which two to three carbon atoms occur between oxygen and nitrogen. There may be used as A such groups as ethylene, 1,2-propylene, 1,3-propylene, 1,2-, 2,3-, or 1,3-butylene, 1,2-hexylene, 1,2-octylene, or 2-butyl-1,3-octylene, this alkylene group conveniently containing up to about 14 carbon atoms. A is often desirably an alkylene group of not over three carbon atoms with at least two carbon atoms between oxygen and nitrogen. In this formula R⁰ represents hydrogen or a neutral or basic aliphatic group, usually having not over 12 carbon atoms, including alkyl, aminoalkyl, hydroxyalkyl, alkoxyalkyl, alkylthioalkyl, alkenoxyalkyl, aralkyl, or cycloalkyl. Typical groups useful as R⁰ are methyl, ethyl, butyl, octyl, decyl, 2-aminoethyl, 2-aminopropyl, 3-aminopropyl, N-methylaminoethyl, N-butylaminoethyl, N-methylaminopropyl, N,N-dimethylaminoethyl, N,N-diethylaminoethyl, N,N-dimethylaminopropyl, morpholinoethyl, pyrrolidinopropyl, piperidinoethyl, benzylaminoethyl, cyclohexylaminoethyl, dicyclohexylaminopropyl, hydroxyethyl, hydroxypropyl, hydroxyethoxyethyl, methoxyethyl, ethoxyethyl, butoxyethyl, octoxyethyl, phenoxyethyl, ethoxyethoxyethyl, butoxyethoxyethyl, vinyloxyethyl, butenyloxyethyl, benzyl, cyclohexyl, α-methylbenzyl, methylbenzyl, methylcyclohexyl, vinylthioethyl, ethylthioethyl, etc. In one preferred class R⁰ is a lower alkyl group. In another R⁰ is an aminoalkyl group with not over three carbon atoms in the indicated alkyl portion thereof.

If desired, acetylene and aminoalcohol are brought together in an inert organic solvent, such as an ether or aromatic hydrocarbon. Acetylene is pressed into the reaction mixture at 20 to 40 atmospheres pressure. Known precautions are taken in thus handling the acetylene. When acetylene is but slowly or no longer taken up, pressure is released and the reaction mixture is worked up. Usually the mixture is readily resolved by fractional distillation.

The products obtained have the structure

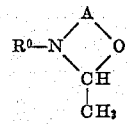

wherein A and R⁰ are as above defined.

The products obtained by the process of this invention have many utilities. They serve as solvents, since they have some unusual compatibilities and miscibilities. For the same reason they are good plasticizers for many kinds of resins and with variations in the kind and size of group attached to the ring nitrogen, they can be widely adapted for any specific type of plastic and application of plastics. They serve as gas-fading inhibitors for cellulose acetate. They are useful as modifiers for aminoplasts. They can be coreacted in urea or melamine resins to give cationic products which are useful, for example, in improving the strength of paper. They serve as acid scavengers in plastics which can develop acid, as in polyvinyl chloride. They act as basic catalysts for epoxy resins. The compounds with N-substituents having four to twelve carbon atoms are fungicidally active and many of the compounds have value in controlling insects. They are useful chemical intermediates. When hydrogen is on the ring nitrogen, for instance, the compounds from this process react with compounds having active halogen. Thus alkyl chlorocarbonates react to give compounds where the size of substituent can be varied at will and which are also useful for purposes noted above. Acyl halides, methyl formate, benzyl chloride, and similar compounds can likewise be thus reacted.

Further details of and variations in procedure are shown in the following illustrative examples, wherein parts are by weight unless otherwise designated.

*Example 1*

About 175 parts of freshly distilled ethanolamine and 60 parts of thiophene-free benzene were mixed and the mixture was heated to reflux with removal of water with the aid of the benzene-water azeotrope. Most of the benzene was then distilled off and the residue (169 parts) was charged to a stirring autoclave. Since later on 10 parts of benzene were recovered, the charge was considered to contain 159 parts of dry ethanolamine. The autoclave was swept with nitrogen and then with acetylene. The charge was heated to 145° C. and acetylene was pressed in at 500 p. s. i. g., while the temperature was maintained at 145°–150° C. After 2.5 hours the reaction was discontinued, the apparent uptake of acetylene being 0.7 mole, while the weight of material taken from the autoclave (180 parts) indicated a gain in weight of 11 parts or 0.42 mole of acetylene. This material was fractionally distilled. At 50°–56° C./60 mm. a portion of 26 parts was obtained which corresponded in composition to 2-methyloxazolidine. At 100° C./90 mm. to 92° C./40 mm. 107 parts were taken which proved to be ethanolamine. There was a residue of 21 parts. The product fraction contained by analysis 55.29% of carbon, 10.38% of hydrogen, and 15.92% of nitrogen (theory 55.14%, 10.41%, and 16.08%, respectively). It had a density, $d_4^{25}$, of 0.9651 and a refractive index, $n_D^{25}$, of 1.4338.

The yield at the 2.5 hour time was 36% based on ethanolamine consumed.

In place of ethanolamine there may be used 2-hydroxypropylamine to give 2,5-dimethyloxazoline, while 3-hydroxypropylamine yields 2-methyltetrahydro-1,3-oxazine.

Example 2

A charge of 97 parts of N-methylethanolamine was placed in a stirred autoclave, which was then swept with nitrogen and acetylene. The autoclave was heated to 100° C. and acetylene pressed in. The reaction temperatures were held between 100° and 115° C. and acetylene pressures at 410–417 p. s. i. g. After 37 minutes the reaction was interrupted and the reaction mixture was resolved by distillation. The weight of this mixture was 109.5 parts, indicating a take-up of 0.48 mole of acetylene. At 35°–42° C./60 mm. there were obtained 32.5 parts and at 42° C./60 mm. another 1.5 parts of 2,3-dimethyloxazolidine. This boiled at 55° C./120 mm. and had a density of 0.8991 and a refractive index, $n_D^{25}$, of 1.4200.

In place of the above N-methylethanolamine there may be used an equivalent amount of other N-alkylethanolamine, N-benzylethanolamine, or N-cyclohexylethanolamine. The products obtained contain the corresponding N-substituent in the 3-position.

Example 3

Redistilled 2-amino-2-methyl-1-propanol was dried by azeotropic distillation with benzene. Of the dried material a portion of 122 parts consisting of 114 parts of 2-amino-2-methyl-1-propanol and 8 parts of benzene was charged to a pressure reactor, which was swept out with nitrogen. Acetylene was pressed in at 400–490 p. s. i. g. while the reactor was held at 154°–178° C. for 10.5 hours. The resulting mixture amounted to 135 parts. It was fractionally distilled. At 62°–75° C./120 mm. a fraction of 46 parts was obtained, a conversion of 31%. There were recovered 66 parts of 2-amino-2-methyl-1-propanol, the yield thus being 73%. The product fraction was redistilled. It boiled at 72° C./125 mm., had a refractive index 1.4240, a density of 0.8946 ($d_4^{25}$), and a neutralization equivalent of 118.6 (calculated 115.2), and contained 62.59% of carbon, 11.20% of hydrogen, and 11.91% of nitrogen (theory 62.57%, 11.38%, and 12.16%, respectively). The product was pure 2,4,4-trimethyloxazolidine.

Example 4

An autoclave was charged with redistilled 1-amino-2-propanol and swept with nitrogen and acetylene. The charge was held at 136°–152° C. with acetylene pressed in at 460–508 p. s. i. g. for 2.6 hours. The reaction mixture was fractionally distilled. After a small forerun, 2,5-dimethyloxazolidine was obtained at 68°–69° C./120 mm. in an amount of 28 parts. Additional product was contained in the next small fraction and then 1-amino-2-propanol was distilled at 97°–100° C./80 mm. in an amount of 100 parts. The product fraction had a density, $d_4^{25}$, of 0.9246, a refractive index, $n_D^{25}$, of 1.4304, and a neutralization equivalent of 101.3 (theory 101.15). It contained by analysis 59.63% of carbon, 10.99% of hydrogen, and 13.90% of nitrogen (theory 59.37%, 10.96%, and 13.85%, respectively).

Example 5

Redistilled 2-amino-1-butanol (139 parts) was reacted as above with acetylene at 422–496 p. s. i. g. and at 160°–182° C. for 2.3 hours. The weight of reaction mixture taken from the autoclave was 153 parts, indicating an uptake of acetylene of 14 parts. It was fractionally distilled, a main fraction of 42 parts of product being taken at 81.5°–83° C./86 mm. and 82 parts of 2-amino-1-butanol being recovered at 113° C./76 mm.–115° C./72 mm.

The products from several preparations carried out about as above and the above product were combined and redistilled, pure 2-methyl-4-ethyloxazolidine being obtained at 84° C./100 mm. It has a refractive index, $n_D^{25}$, of 1.4302, a density, $d_4^{25}$, of 0.9119, and a neutralization equivalent of 115.7 (theory 115.2).

In the same way other 2-amino-1-alkanols can be reacted to give corresponding 2-methyl-4-alkyloxazolidines, particularly with alkyl groups up to 12 carbon atoms. When 3-amino-1-alkanols are used, comparable 2-methyl-4-alkyltetrahydro-1,3-oxazines are formed.

Example 6

A charge of 161 parts of 3-amino-1-propanol was placed in a stirring autoclave, which was swept with nitrogen and acetylene. It was heated to 136°–154° C. while acetylene was pressed in at 440–515 p. s. i. g. for 2.8 hours. The gain in weight of the material in the autoclave was 18.5 parts. It was fractionally distilled, 27 parts of 2-methyltetrahydro-1,3-oxazine being obtained as the fraction taken at 68°–70° C./100 mm. There was recovered at 95° C./25 mm. a fraction of 97 parts of 3-amino-1-propanol. The product had an $n_D^{25}$ value of 1.4382, a $d_4^{25}$ value of 0.9480, and a neutralization equivalent of 101.3 (theory 101.15). Kjeldahl nitrogen was 13.6% (theory 13.85%).

Example 7

A charge of 159 parts of redistilled N-aminoethyl-ethanolamine was reacted with acetylene in a stirring autoclave at 136°–152° C. Acetylene pressures were 415–500 p. s. i. g. The reaction was discontinued after 3.9 hours. The reaction mixture amounted to 183 parts. It was fractionally distilled to give 72 parts of product at 55°–60° C./3 mm. and at 68°–74° C./0.15 mm. 59 parts of N-aminoethylethanolamine. The product had a neutralization equivalent of 65.3 (theory for 2-methyl-3-(2-aminoethyl)-oxazolidine is 65.09) and a nitrogen content of 21.1% (21.5% theory) by Kjeldahl analysis. The product was originally a water-white liquid which yellowed on standing and crystallized to a solid melting at 54°–57° C.

The above procedure was repeated with 108 parts of N-aminoethylethanolamine which was dried by azeotropic distillation with benzene. The gain in weight was here 32 parts. The reaction mixture was carefully fractionated to give a product distilling at 73°–90° C./10 mm. in a 75% yield. The distillate crystallized as above. Recrystallization from well-dried ether gave a crystalline solid melting at 59.5°–60.5° C. The product appears to have the structure

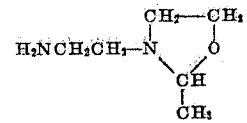

Example 8

Redistilled N-α-methylbenzylethanolamine (183 parts, 1.1 moles) was reacted at 147° C. with acetylene at pressures of 450–512 p. s. i. g. for 2.7 hours. The reaction mixture was fractionally distilled to give 11.5 parts of 2-methyl-3-α-methylbenzyloxazolidine, distilling at 68°–72° C./0.5 mm. and having a refractive index, $n_D^{25}$, of 1.5169, $M_D$ 57.16 (theory 57.40) and a density, $d_4^{25}$, of 1.0122. There was recovered α-methylbenzylethanolamine in an amount of 118.5 parts in a fraction coming over at 76°–80° C./0.1 mm. The conversion to oxazolidine was 5.4% and the yield 15%.

Experience seems to indicate that it is better to work at relatively low conversions and not to extend the time of reaction unduly.

Example 9

There was charged to a magnetically stirred autoclave 106 parts of diethanolamine, which had been freshly redistilled at 119°–121° C./1.0 mm. The autoclave was swept out with nitrogen and with acetylene and heated at 115°–135° C. while acetylene was pressed in at 350–435 p. s. i. g. for 45 minutes. The reaction mixture was distilled and the distillate was fractionated to give 12.7 parts of 2-methyl-3-hydroxyethyloxazolidine, boiling at 69° C./4.5 mm. and having a refractive index, $n_D^{25}$, of 1.4663. A fraction of pure diethanolamine of 76 parts was also obtained. Conversion was 10% and yield was 72%.

Example 10

A pressure reactor was charged with 123 parts of N-β-vinyloxyethyl-N-hydroxyethylamine and in accordance with the procedures detailed above reacted at 135°–148° C. with acetylene pressed in at 250–400 p. s. i. g. for three hours. The reaction mixture was fractionally distilled to give 85.3 parts of the starting aminoalcohol and 26.7 parts of 2-methyl-3-vinyloxyethyloxazolidine. This was redistilled with careful fractionation. A cut of 20.2 parts of pure 2-methyl-3-vinyloxyethyloxazolidine was obtained at 76°–78° C./9 mm. It had a refractive index, $n_D^{25}$, of 1.4552, a density, $d_4^{25}$, of 0.977, and a purity by titration with acid of 101%. It contained by analysis 8.7% of nitrogen. Conversion was 13% and yield 40%.

This compound is interesting not only as solvent and modifier of plastics, but also a polymerizable substance. It gives useful copolymers with other polymerizable vinylidene compounds, supplying basic properties.

Example 11

There were mixed 384 parts of N-methylethanolamine and 85 parts of methylal. This mixture was passed into an absorption vessel where it was cooled to 5° C. Acetylene was passed thereinto until 86 parts of acetylene were absorbed, the pressure of acetylene then being 220 p. s. i. g. The mixture with absorbed acetylene was now passed as liquid under pressure sufficient to prevent desorption of acetylene into a heated reaction zone maintained at 178° C. Residence time in this zone was 3.5 minutes. The liquid from this zone was quickly cooled, pressure thereon was released, and the liquid was distilled. The desired 2,3-dimethyloxazolidine distilled at 42° C./60 mm. Conversion was 54% based on the acetylene.

This example illustrates an exceedingly important variation of procedure wherein there is used as solvent one which has high solubility for acetylene. This permits charging the reaction mixture with the acetylene to be used while the mixture is at low temperature and avoids use of acetylene at high pressures and temperatures. This results in greater safety. The mixture with absorbed acetylene is heated as a liquid under sufficient pressure to maintain exclusively the liquid phase. This requires 900 to 5000 p. s. i. on the liquid, high pressures of gases being thus avoided. This method is advantageous in permitting a short reaction time and in reducing greatly by-product formation.

As particularly useful solvents for this condensed or liquid phase method there may be used such compounds as dimethylformamide, dimethylsulfoxide, N-methylpyrrolidone, phosphate or phosphite esters, typical of which are triethyl phosphate and diethyl phosphite, and ethers, which include dioxane, dioxolane, 2-methyldioxolane, monomethyl, dimethyl, monoethyl, and diethyl ethers of ethylene glycol, diethylene glycol, triethylene glycol, or tetraethylene glycol, tetrahydrofuran, dimethyl formal, diethyl formal, diethyl acetal, dimethyl acetal, and the like. These may be used as the sole solvent or in conjunction with other solvents, such as alcohols.

Example 12

A charge of 503 parts of ethanolamine was passed into an absorption vessel, where acetylene was passed thereinto under pressure. The charge was cooled to 7° C. and held at this point until a total of 26 parts of acetylene was absorbed up to a pressure of 300 p. s. i. g. Now the liquid with its charge of dissolved acetylene was heated at 185° C. while the charge was maintained entirely in the liquid phase by sufficient pressure to prevent desorption of acetylene. The reaction mixture was cooled and the pressure thereon released. It was distilled. The desired 2-methyloxazolidine came over at 62°–65° C./100 mm. Conversion based on the alcohol was 5%, but yield was 70%.

The products obtained as described above have physical properties which distinguish them from the isomeric vinyl ethers. Infra-red data show that the compounds obtained above are not vinyl ethers. It may be remarked that vinyl ethers are obtained from the starting materials when strong bases are used as catalysts. By the above method a convenient and effective method is provided for making 2-methyloxazolidines and tetrahydro-1,3-oxazines, many of which are new compounds. Of these there should especially be mentioned 2,4,4-trimethyloxazolidine which is unusually stable for this type of compound. Also, the vinyloxyalkyl derivatives are novel and highly useful.

We claim:

1. A process for preparing cyclic compounds of the structure

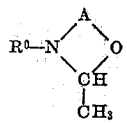

which comprises mixing an aminoalcohol of the formula

R⁰NH—A—OH and acetylene and reacting by heating the mixture thereof between 100° and 200° C. under a pressure from 20 to 40 atmospheres of acetylene, in the above formulas A being an alkylene group of not over 4 carbon atoms with a chain of two to three carbon atoms thereof between the indicated nitrogen and oxygen atoms and R⁰ being a member of the class consisting of hydrogen, alkyl groups of not over 12 carbon atoms, and the vinyloxyethyl, hydroxyethyl, aminoethyl, benzyl, and cyclohexyl groups.

2. A process for preparing cyclic compounds of the formula

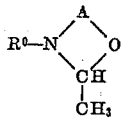

which comprises mixing an aminoalcohol of the formula

R⁰—NH—A—OH and acetylene and reacting by heating the mixture thereof between 100° and 200° C. under a pressure between 20 and 40 atmospheres of acetylene, in the above formulas A being an alkylene group of not over 4 carbon atoms having two atoms between the indicated nitrogen and oxygen atoms and R⁰ being a lower alkyl group.

3. A process for preparing cyclic compounds of the formula

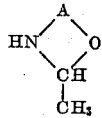

which comprises mixing an aminoalcohol of the formula

H₂N—A—OH and acetylene and reacting by heating the mixture thereof between 100° and 200° C. under pressure between 20 and 40 atmospheres of acetylene, A in the above formulas being an alkylene group of not over three carbon atoms with at least two thereof between the indicated nitrogen and oxygen atoms.

4. A process for preparing a compound of the formula

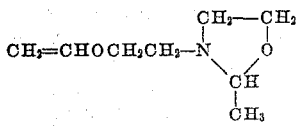

which comprises mixing together an N-vinyloxyethyl-N-hydroxyethylamine and acetylene and reacting by heating the mixture thereof between 100° and 200° C. under pressure between 20 and 40 atmospheres of acetylene.

5. A process for preparing a compound of the formula

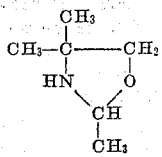

which comprises mixing together 2-amino-2-methyl-1-propanol and acetylene and reacting by heating the mixture thereof between 100° and 200° C. under pressure between 20 and 40 atmospheres of acetylene.

6. A process for preparing a compound of the formula

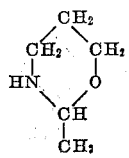

which comprises mixing together 3-aminopropanol and acetylene and reacting by heating the mixture thereof between 100° and 200° C. under pressure between 20 and 40 atmospheres of acetylene.

7. A process for preparing a compound of the formula

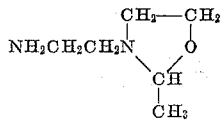

which comprises mixing together β-(β-aminoethyl)aminoethanol and acetylene and reacting by heating the mixture thereof between 100° and 200° C. under pressure between 20 and 40 atmospheres of acetylene.

References Cited in the file of this patent

UNITED STATES PATENTS 2,250,408     De Groote _____ July 22, 1941

OTHER REFERENCES

Doughty et al.: J. Am. Chem. Soc., vol. 72, p. 2866–7 (1950).